US012783851B2

(12) United States Patent
Kou et al.

(10) Patent No.: US 12,783,851 B2
(45) Date of Patent: Nov. 3, 2026

(54) METHOD AND APPARATUS FOR IMPROVING THE ACCURACY OF A NEURAL NETWORK

(71) Applicants: Baidu USA, LLC, Sunnyvale, CA (US); Baidu.com Times Technology (Beijing) Co., Ltd., Beijing (CN)

(72) Inventors: Haofeng Kou, Palo Alto, CA (US); Huimeng Zheng, Beijing (CN)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 996 days.

(21) Appl. No.: 18/009,980

(22) PCT Filed: Dec. 10, 2020

(86) PCT No.: PCT/CN2020/135357

§ 371 (c)(1),
(2) Date: Dec. 12, 2022

(87) PCT Pub. No.: WO2022/120741

PCT Pub. Date: Jun. 16, 2022

(65) Prior Publication Data

US 2023/0229890 A1 Jul. 20, 2023

(51) Int. Cl.
*G06N 3/045* (2023.01)
*G06N 3/08* (2023.01)

(52) U.S. Cl.
CPC ............... *G06N 3/045* (2023.01); *G06N 3/08* (2013.01)

(58) Field of Classification Search
CPC ........ G06N 3/045; G06N 3/08; G06N 3/0464; G06N 3/09; G06N 3/063; G06N 3/0455;
(Continued)

(56) References Cited

U.S. PATENT DOCUMENTS

| | | | |
|---|---|---|---|
| 9,799,327 B1 | 10/2017 | Chan et al. | |
| 10,410,114 B2 * | 9/2019 | Kang | G06N 3/045 |
| 2019/0080240 A1 | 3/2019 | Andoni et al. | |

FOREIGN PATENT DOCUMENTS

| | | |
|---|---|---|
| CN | 106709565 A | 5/2017 |
| EP | 3144859 A2 | 5/2017 |

OTHER PUBLICATIONS

Teerapittayanon et al., "Distributed Deep Neural Networks over the Cloud, the Edge and End Devices", 2017, 328-339, Retrieved using IEEE from the Internet: <URL:https://ieeexplore.ieee.org/document/7979979> (Year: 2017).*

(Continued)

*Primary Examiner* — Kakali Chaki
*Assistant Examiner* — Ibrahim Rahman
(74) *Attorney, Agent, or Firm* — Oppedahl Patent Law Firm LLC

(57) ABSTRACT

Embodiments presented herein facilitate improvement of a deployed neural network model's accuracy without significantly affecting its operation. In one or more embodiments, online training of the deployed model may be performed using a second neural network model that has higher accuracy than the deployed neural network model. In one or more embodiments, the second neural network model may also be improved online. Embodiments may be deployed in system, such as edge computing environments, in which neural networks deployed at the edge can be centrally monitored and updated.

22 Claims, 6 Drawing Sheets

(58) Field of Classification Search
CPC ...... G06N 3/0895; G06N 3/091; G06N 3/092; G06N 3/094; G06N 3/096; G06N 3/098; G06N 3/0985; G06N 3/04
See application file for complete search history.

(56) References Cited

OTHER PUBLICATIONS

International Search Report dated Sep. 10, 2021, in the International Patent Application No. PCT/CN2020/135357. (4 pgs).
Written Opinion dated Sep. 10, 2021, in the International Patent Application No. PCT/CN2020/135357. (4 pgs).

* cited by examiner

METHOD AND APPARATUS FOR IMPROVING THE ACCURACY OF A NEURAL NETWORK

CROSS-REFERENCE TO RELATED APPLICATIONS

This patent application is filed pursuant to 35 USC § 371 as a US National Phase Application of International Patent Application No. PCT/CN2020/135357, filed on 10 Dec. 2020, entitled "TRAINING OF DEPLOYED NEURAL NETWORKS," listing Haofeng Kou and Huimeng Zheng as inventors, which patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods for online training of deployed neural networks.

B. Background

Deep neural networks (DNNs) have achieved great successes in many domains, such as computer vision, natural language processing, recommender systems, etc. For example, real-world surveillance and security monitoring landing scenes that typically just recorded video in case it was needed later using digital video recorders or networked video recorders are being replaced and enriched by machine learning/artificial intelligence vision systems that not only capture images but also can detect objects, such as people, in the captured images. In some instances, the detected object may also undergo additional machine learning processing to recognize the detected objects.

It should be noted that machine learning/artificial intelligence systems are being widely deployed in a number of different settings and for a number of different applications. Despite their varied usages and applications, there exists some common issues. One issue is that, while performance may be very good, in most cases the deployed neural network model's performance may be improved. However, once a neural network is deployed, it is challenging to improve it. The neural network may be operating in a critical function, so testing or upgrading it may be impractical or practically impossible without causing significant disruption. Also, depending upon the deployment conditions, the computing system upon which the deployed neural network operates may not have the resources to perform testing and or training.

Accordingly, what is needed are systems and methods to facilitate online training to further improve a DNN model's accuracy without adversely affecting performance or causing significant disruptions.

BRIEF SUMMARY

Systems and methods consistent with the present invention training of deployed machine learning networks. For example, in one or more embodiments, a computer-implemented method comprises the steps of: receiving a set of results, which were obtained using a first neural network model that receives input data as an input and operates using a first computing system. In one or more embodiments, accuracy of the first neural network may be assessed using a second neural network model, which is more complex than the first neural network, and which operates on a second computing system, which is communicatively coupled to the first computing system. Results from at least some of input data input that has been operated on by the second neural network may be compared against corresponding results from the first neural network. In one or more embodiments, responsive to the accuracy of the first neural network being below a threshold measure, input data collected for the first neural network may be obtained and this collected input data may be used as inputs into the second neural network to obtain corresponding results; thereby forming training data comprising the collected input data as input data and the corresponding results from the second neural network as ground truth results. In one or more embodiments, this training data is used to retrain/update the first neural network, and responsive to the updated first neural network achieving accuracy above an update threshold value, the updated first neural network may be deployed on the first computing system.

In one or more embodiments, the computer-implemented method may also include the steps of, responsive to the updated first neural network not achieving accuracy above a retraining threshold value given existing training data: obtaining additional input data collected for the first neural network; obtaining additional corresponding results using the additional collected input data as inputs into the second neural network; and performing supplemental training on the first neural network or the updated first neural network using the additional collected input data and the additional corresponding results as supplemental training data. In one or more embodiments, if the updated first neural network achieves accuracy above an update threshold value, it may be deployed on the first computing system. In one or more embodiments, if the updated first neural network did not achieve accuracy above the update threshold value, the above-listed steps may be repeated by gathering more data and continuing retraining/updating.

In one or more embodiments, the additional or supplemental training data may be selected to include at least some training data that is problematic for the first neural network (i.e., that produced inaccurate results by the first neural network).

In one or more embodiments, the second computing system is communicatively coupled to a plurality of first computing systems, in which each first computing system comprises a version of the first neural network. In such embodiments, the method may further comprise: obtaining from each of at least some of the plurality of first computing systems its version of the first neural network; forming a set of combined neural networks comprising a combination of two or more of the first neural networks; using evaluation data to obtain accuracy measures for each combined neural network; selecting a combined neural network with an acceptable accuracy measure; and deploying the combined neural network as an updated neural network on at least one of the first computing systems.

In one or more embodiments, the second computing system is communicatively coupled to a central computing system, which is communicatively coupled to a set of second computing systems that each comprises its version of training data. In such embodiments, the method may further comprise: sending, from the second computing system to the central computing system, its training data; and receiving from the central computing system an updated second neural network, wherein the updated second neural network was obtained by retraining the second neural network using a training data superset obtain from at least some of the plurality of second computing systems.

In one or more embodiments, the training data selected from the plurality of second computing systems is done using one or more observed characteristics associated with the training data. For example, the one or more observed characteristics associated with the training data may comprises selecting training data from first computing systems deployed within a region or training data obtained from first computing systems deployed in an environment with similar conditions.

In other embodiments, a computer-implemented method may comprise the steps of: capturing input data using at least one of the one or more sensor devices; obtaining a set of results using a first neural network model that receives the input data as an input; sending at least some of the set of results and the corresponding input data to a second computing system that accessing accuracy of the first neural network using a second neural network model, which neural network model is more complex than the first neural network, by comparing results of the second neural network model with corresponding results from the first neural network; receiving one or more requests to provide collected input data to the second computing device; providing the collected input data to the second computing device that uses the collected input data to form training data comprising the collected input data as input data and corresponding results from the second neural network as ground truth results; and deploying an updated first neural network in place of the first neural network, in which the updated first neural network was retrained using at least some of the training data.

In one or more embodiments, a request to provide collected input data to the second computing device may comprise a request to collect input data with one or more characteristics that produce inaccurate results by the first neural network.

In one or more embodiments, the second computing system is communicatively coupled to a plurality of first computing systems, in which each first computing system comprises a version of the first neural network and the method further comprises obtaining from the second computing system a combined neural network comprising a combination of two or more of first neural networks (which may be updated/retrained first neural networks), wherein the combined neural network was selected from among a plurality of different combined neural networks based upon accuracy of results of the different combined neural networks. The combined neural network may then be deployed on the first computing system.

Additional aspects of the present invention are directed to computer systems, to methods, and to computer-readable media having features relating to the foregoing aspects. The features and advantages described herein are not all-inclusive—many additional features, embodiments, and advantages will be apparent to one of ordinary skill in the art in view of the accompanying drawings and description. It shall also be noted that the language used herein has been principally selected for readability and instructional purposes, and shall not be used to limit the scope of the inventive subject matter.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it shall be understood that it is not intended to limit the scope of the disclosure to these particular embodiments. Items in the figures may not be to scale.

DETAILED DESCRIPTION OF EMBODIMENTS

Figure 1:
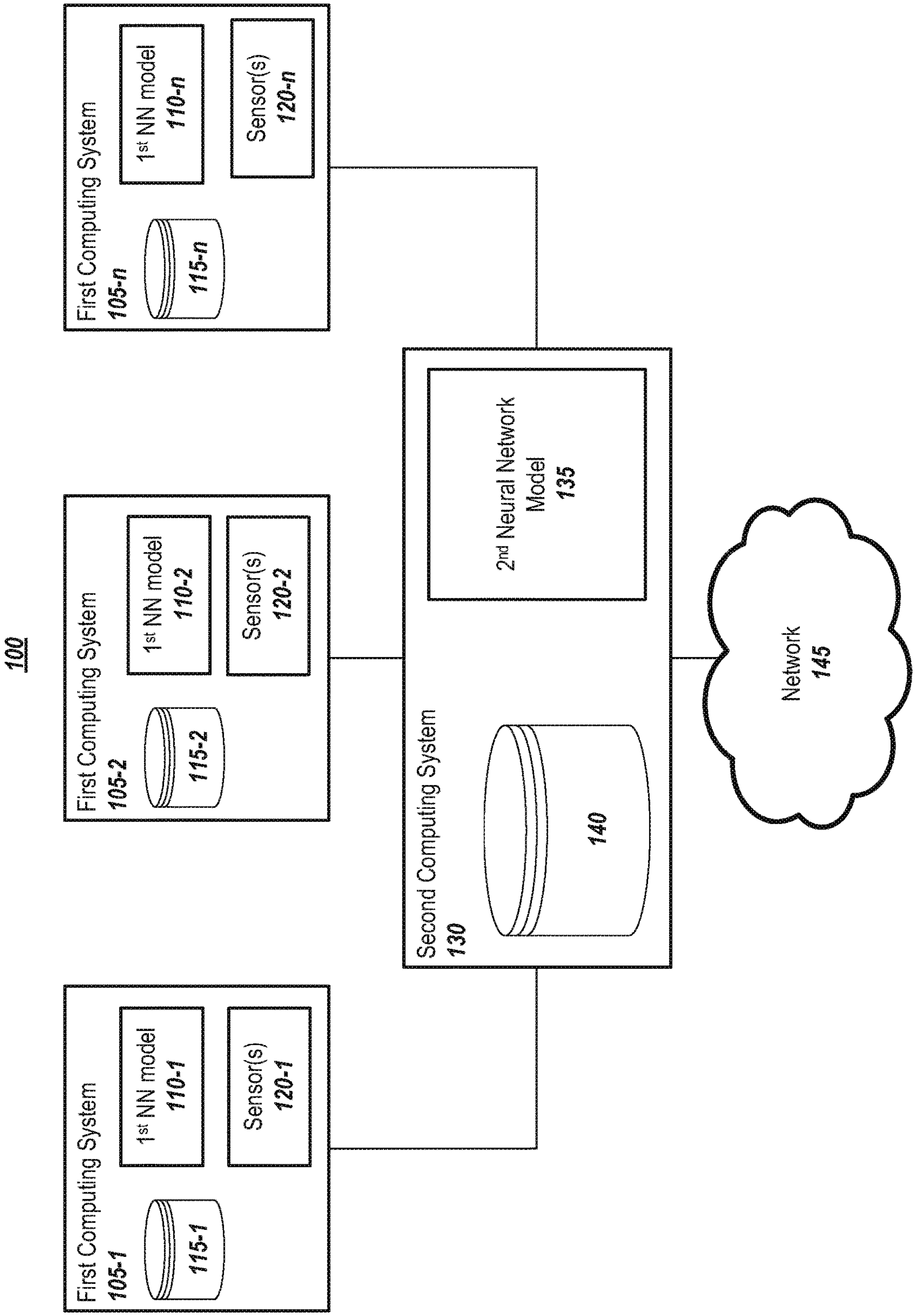
FIG. 1 graphically depicts a deployed networked system, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms “coupled,” “connected,” “communicatively coupled,” “interfacing,” “interface,” or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to “one or more embodiments,” “preferred embodiment,” “an embodiment,” “embodiments,” or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of image recognition, aspects of the present disclosure are not so limited. Accordingly, the aspects of the present disclosure may be applied or adapted for use in other supervised deep learning system, including but not limited to any system for object detection, classification, and/or recognition for objects, faces, characters (OCR), etc.

A. General Introduction

As noted above, neural networks (NNs) have achieved great successes in many domains, such as computer vision, natural language processing, recommender systems, etc. Despite their varied usages and applications, the issue of automating the updating/upgrading processes is not a trivial one. While a deploy neural network model may perform very well, in many instances the deployed neural network model's performance can be improved. However, monitoring a neural network model's performance and trying to improve the deploy neural network once it has been deployed is problematic. Testing and/or upgrading a deployed neural network may be impractical or practically impossible without causing some disruption—which can be a significant factor if the neural network is operating in a critical role. For example, if the neural network is deployed in a manufacturing or production environment, retraining the neural network model may require shutting down part of the production facilities that relies upon the neural network operating. Also, depending upon the deployment conditions, the computing system upon which the deployed neural network operates may not have the resources to perform testing and or training.

There are different approaches to improve a neural network model's accuracy. Consider, by way of illustration an image processing system that detects people in an airport or other area. One approach is keep refining the model before it is deployed by collecting data, labeling the data, and then keep training the neural network before deploying to it final device or devices. However, such an approach keeps the neural network from being deployed and does not directly address the issue of how to improve the neural network once deployed. Another approach is to improve the neural network models by designing and training new neural network model designs. Again, such an approach does not directly address how to improve the neural network once deployed; rather, it merely replaces one neural network for another with the hope that the new model performs better than the original one once deployed. These approaches are traditional development approaches that researcher may perform, but that do not directly address the core problems. Accordingly, presented herein are embodiments of methodologies that overcomes the drawbacks.

Consider, for example, real-world surveillance and security monitoring that comprises machine learning/artificial intelligence vision systems that not only capture images but also detect objects, such as people, in the captured images by using a neural network and undergo additional machine learning processing to recognize the detected objects. In the real-world surveillance and security monitoring landing scenes, the systems may comprise an vision system (e.g., an AI camera system that includes one or more sensors (e.g., a camera) and one or more neural network models that operate on the data captured by the camera) running on an edge computing device. In one or more embodiments, the AI camera system may be communicatively connected to another computing system (e.g., a smart box system), which may also have one or more neural networks available to it or operating on it. These deep neural network models on the vision system (and in one or more embodiments on the smart box system) play a major role for the products in term of accuracy and performance, but there is always a performance gap between the pretrained model and the real-world ground truth because of a number of factors.

For example, in a crowd counting use case, if the model is trained based upon the data collected in summer when people wear light colored, short clothes, then it may not work well in winter when people tend to wear dark colored, heavy clothes. This example illustrations that there is a requirement to refine the neural network model according to the real scenario where/when the system is deployed, but it is hard for the pretrained model to be fit with all different use cases.

In one or more embodiments, activities may be converted into events, and these events reorganized into trigger+action=workflow mode. For example, a trigger may be the detection model while actions are the recognition models, which work together as a workflow.

Assuming a system in which different types of models and DNN train/inference software is installed on an edge computing system comprising a smart box system connected to one or more AI cameras. In one or more embodiments, a pretrained lightweight inference model may be installed on the AI camera system or on the smart box edge computing device, and a more robust, heavyweight inference model is also deployed on the local smart box. The heavyweight model is likely to be more complex—thereby using more computing resources (memory, computing time, energy, processing power, etc.), but it achieves higher accuracy than the lightweight model. For example, in one or more embodiments, a module, such as MobileNet-SSD (which is a Single-Shot multibox Detection (SSD) network), may be used as a starting point for the lightweight model and a module, such ResNet101, may be used as a starting point for the heavyweight model.

In one or more embodiments, the smart box also has a mechanism for data labeling and training environment setup. For example, in one or more embodiments, the labelling and training functionality may be already installed on the smart box system before it is deployed to the field, and this labelling and training functionality is used to locally retrained the neural network on smart box system. In one or more embodiments, the labelling and training functionality may be downloaded to an already deployed system.

For human body face and crowd applications, normally there is a detection model and a recognition model. That is, for example, the detection model finds the face and body in the image and places the detected objects in a bounding box or circle; then, the marked data (e.g., the bounding boxes) are fed into the recognition model, which performs data content analysis. It shall be noted that embodiments may be applied to the detection model, the recognition model, or both. For sake of illustration, the following discussion will use the recognition model as the example.

During the normal inference execution, at least some of the recognition results generated on the AI camera system are supplied to the smart box system. Thus, in one or more embodiments, the AI camera system results along with the related input data are save on the smart box with local storage. In one or more embodiments, during a set time (e.g., during an off-peak time such as system idle or nighttime), or as a background process on the smart box system, the heavyweight inference model may be applied to the saved data and the results compared to find differences, which may be labelled with the corrected results (i.e., the results output from the heavyweight inference model) to build up a new data set.

In one or more embodiments, the new generated data set may be used training data for online training on the smart box. For example, in one or more embodiments, the originally lightweight pretrained model may be further finetuned using this new training data set to improve its accuracy without losing performance.

After online training, a better accuracy lightweight inference model is generated on smart box system, and this retrained or updated lightweight neural network model may be deployed locally from the smart box system to one or more AI camera systems connected to the smart box system. It should be noted that this process may repeated any number of times and at any frequency of intervals (e.g., once per week to multiple times per day, or any combination thereof).

In a networked system that comprises a number of smart box systems, after a while, there may be better lightweight inference neural network models generated on different smart box systems with their respective data sets. Thus, in one or more embodiments, these data sets may be centralized to a central cloud for further model optimization to update the basic inference model, the heavyweight inference model, or both. As with updates discussed in the prior paragraph, this process may be repeated any number of times and at any frequency of intervals.

It shall be noted that embodiments provide a number of unique benefits, including at least the following. First, neural network models may be provided with local online training based on the real, native scenario data, which results in better accuracy. Second, embodiments take advantage of the existing edge computing devices, such as an AI camera system and smart box computing system for online training. Third, the neural network models, both on the end edge computing systems (e.g., AI camera system) and local computing system (e.g., smart box systems) may be updated frequency according to the real scenario data

B. Embodiments

1. Example System Embodiments

FIG. 1 graphically depicts an example deployed networked system, according to embodiments of the present disclosure. As depicted in FIG. 1, the system 100 comprises a first computing device 105 communicatively coupled to a second computing device 120. In one or more embodiments, a first computing system 105 comprises at least a first neural network model 110, one or more sensor devices 120, memory/storage 115 for storing data obtained from the one or more sensors (among other data), and other components (not shown) that are typical for a computing system. As illustrated, the system 100 may comprise a number of similar first computing systems 105-*x*, which are communicatively coupled to the same second computing system 130. The first computing systems may be, for example, edge computing devices such as AI cameras.

In one or more embodiments, the second computing system 130 may comprise a second neural network model or models 135, a storage or memory system 140, among other components (not shown) that are typical for a computing system. In one or more embodiments, the second computing system may comprise a plurality of communication ports for connecting to the first computing systems 105-*x* and may also connect to a larger network 145, which may facilitate connection to a centralized computing resource or resources (not shown).

In one or more embodiments, the first neural network model may be referred to as a lightweight model, and the second neural network model may be referred to as a heavyweight model. In the depicted example, the first computing system may have more limited resources (e.g., processor, memory, power, etc.); and therefore, it may not be able to operate a complex neural network. It should be noted that each first computing system 105 operates a same class or type of first neural network model, but as will be explained in more detail below, these first neural network models may be the same or vary somewhat between first computing systems.

In contrast, the second computing system, which may be for example a smart box system, may comprise more extensive and more powerful processor(s), more memory, and utilize more power; and therefore, it may be able to operate a more complex and robust, but resource-intensive, neural network model. Since the heavyweight neural network model is more complex and has access to more resources, its accuracy will be better than the lightweight neural network model.

Given such an example system, the next sections set for some example methods that may be employed to improve the performance of the deployment neural networks.

2. Methodologies Embodiments

Figure 2:
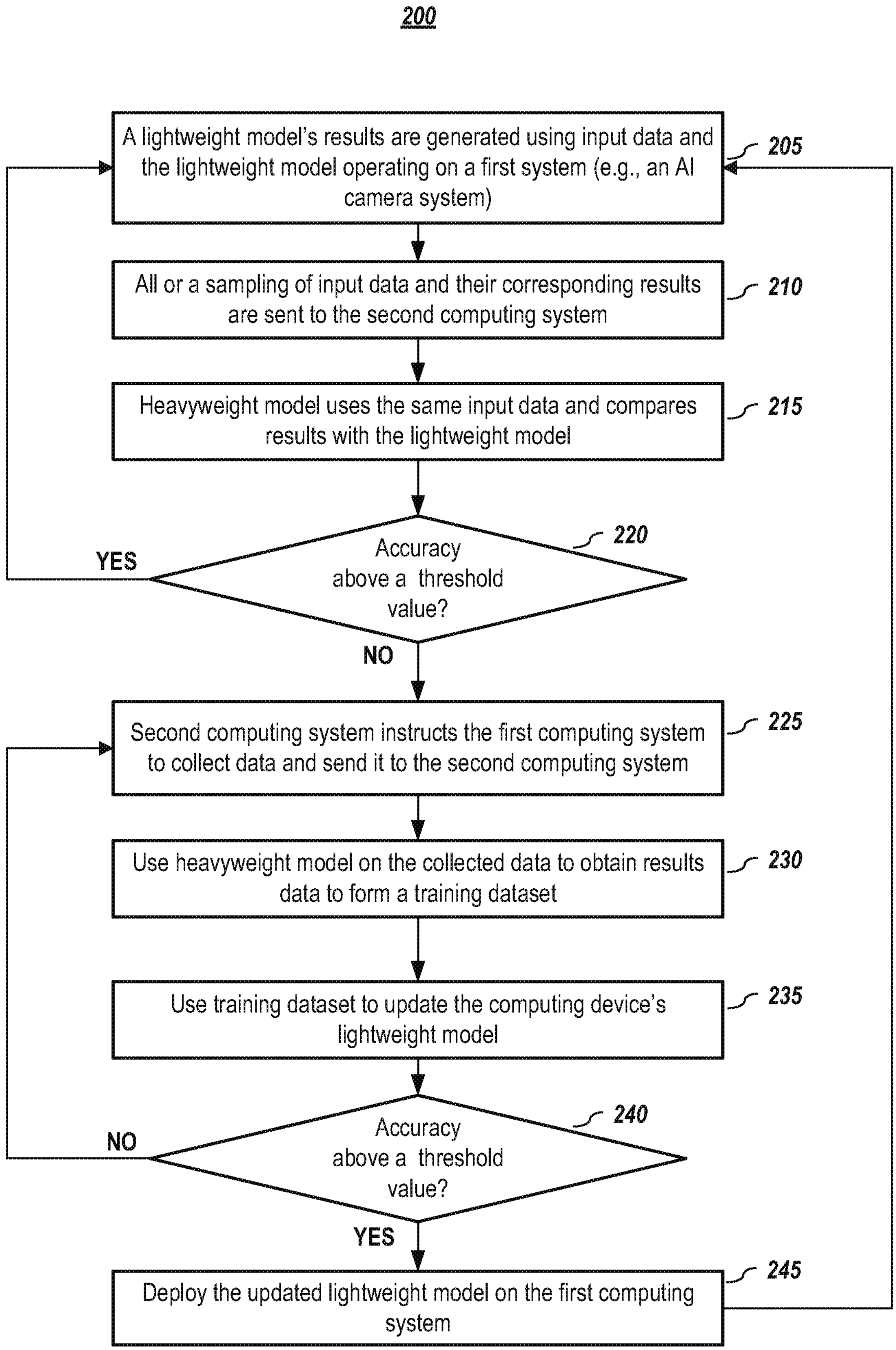
FIG. 2 depicts a methodology for monitoring and retraining a deployed neural network model, according to embodiments of the present disclosure.

FIG. 2 depicts a methodology for monitoring and updating a deployed neural network model, according to embodiments of the present disclosure. In one or more embodiments, a lightweight model's (e.g., first neural network model 110) results are generated (205) using input data and the lightweight model. The input data may be data collected by one or more sensors (e.g., sensors 120) connected to a computing device (e.g., first computing system 105) that operates the first neural network. In one or more embodiments, all or a sampling of input data and their corresponding results are sent (210) to the second computing system (e.g., second computing device 130). At the second computing system, in one or more embodiments, a heavyweight model (e.g., second neural network model 135) uses the same input data and compares (215) results with the lightweight model.

Based upon the comparison, if the lightweight neural network model's accuracy is above an accuracy threshold value, the process may return to step 205. Alternatively, if the lightweight neural network model's accuracy is not above (220) an accuracy threshold value, in one or more embodiments, the second computing system may instruct (225) the first device (e.g., first computing system 105) to collect data (225) and send it to the second computing system. The collected data may comprise just input data or may also include, for at least some of the input data, corresponding results data from the first neural network. In one or more embodiments, the collected data may have been previously collected, may be collected after receiving the request for data, or may be a combination of both.

In one or more embodiments, the heavyweight model operates (230) on the collected data to obtain results data to form a training dataset. This training dataset may be used to retrain/update (235) the lightweight model. In one or more embodiments, the second computing system comprises a training environment setup, which may be used to retrain/update the first neural network model using the training dataset.

If the retrained lightweight neural network model's accuracy is not above (240) an accuracy threshold value, in one or more embodiments, the second computing system may instruct (225) the first device to collect more data to further enlarge the training dataset by repeating the steps of 225-235. If the retrained lightweight neural network model's accuracy is above an accuracy threshold value (either the first time through retrain or after two or more iterations), the retrained/updated lightweight neural network model may be deployed on the first computing system.

Figure 3:
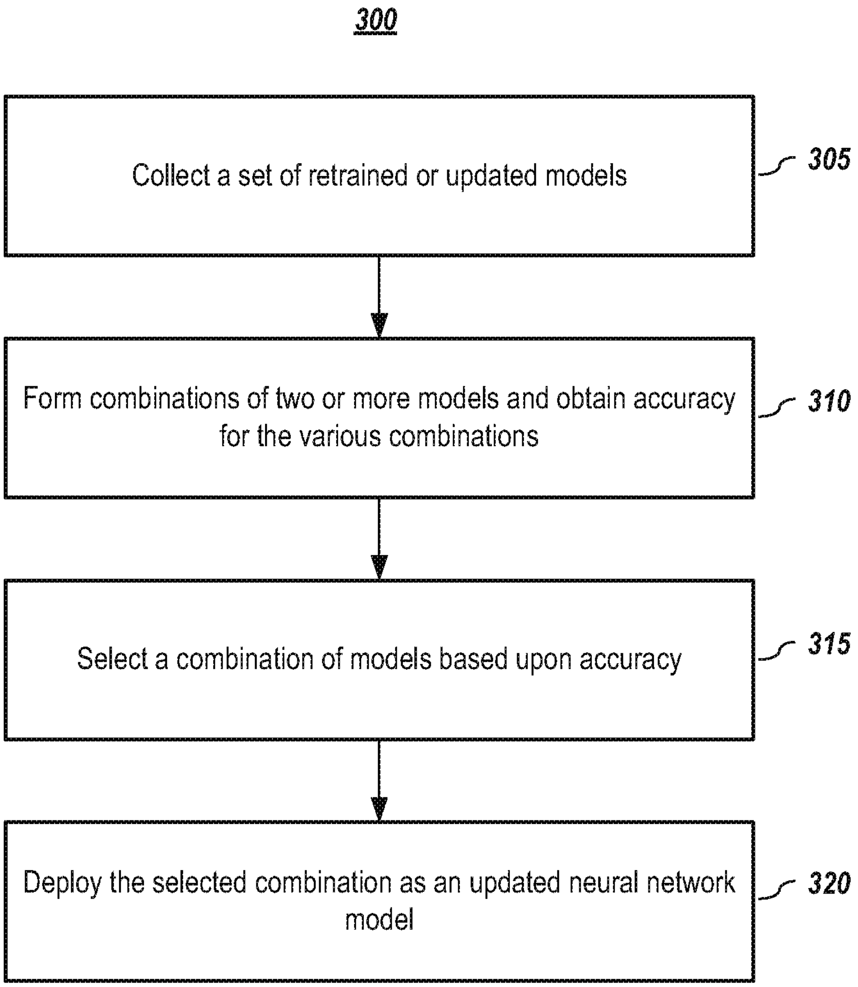
FIG. 3 depicts a methodology for creating a combined neural network, according to embodiments of the present disclosure.

As illustrated in FIG. 3, in one or more embodiments, retraining/updating the first neural network model may comprise more than simply retraining it. Rather, updating the first neural network model may changing or supplementing the model itself. For example, FIG. 3 depicts a methodology for creating a combined neural network, according to embodiments of the present disclosure. In one or more embodiments, a set of retrained or updated models may be collected. For example, the second computing device may collect (305) a set of original, retrained, and/or updated neural network models from the first computing devices communicatively coupled to the second computing device. In one or more environments, the collected models may be combined (310) in a set of combination neural network models, in which each combination comprises two or more models, and the accuracies of the various combinations are obtained. In one or more embodiments, the combinations of neural network models may be achieved by using an ensemble in which, for an input, the output of a neural network of the combination that has the highest inference probability is selected. Alternatively, or additionally, the inference probability of the combined neural network may be combined to determine a final output. Alternatively, or additionally, the labelled data may be combined and merged, and various models retrained using the data (or at least a portion thereof), and the model with the best accuracy/performance is selected.

In one or more embodiments, the combination of models that achieved the best accuracy may be selected (315) as the updated neural network, and the selected combination may be deployed as an updated neural network model on one or more computing systems.

In addition to updating the lightweight neural network model, the heavyweight neural network model may also be updated. Consider, by way of illustration, the network environment depicted in FIG. 4.

Figure 4:
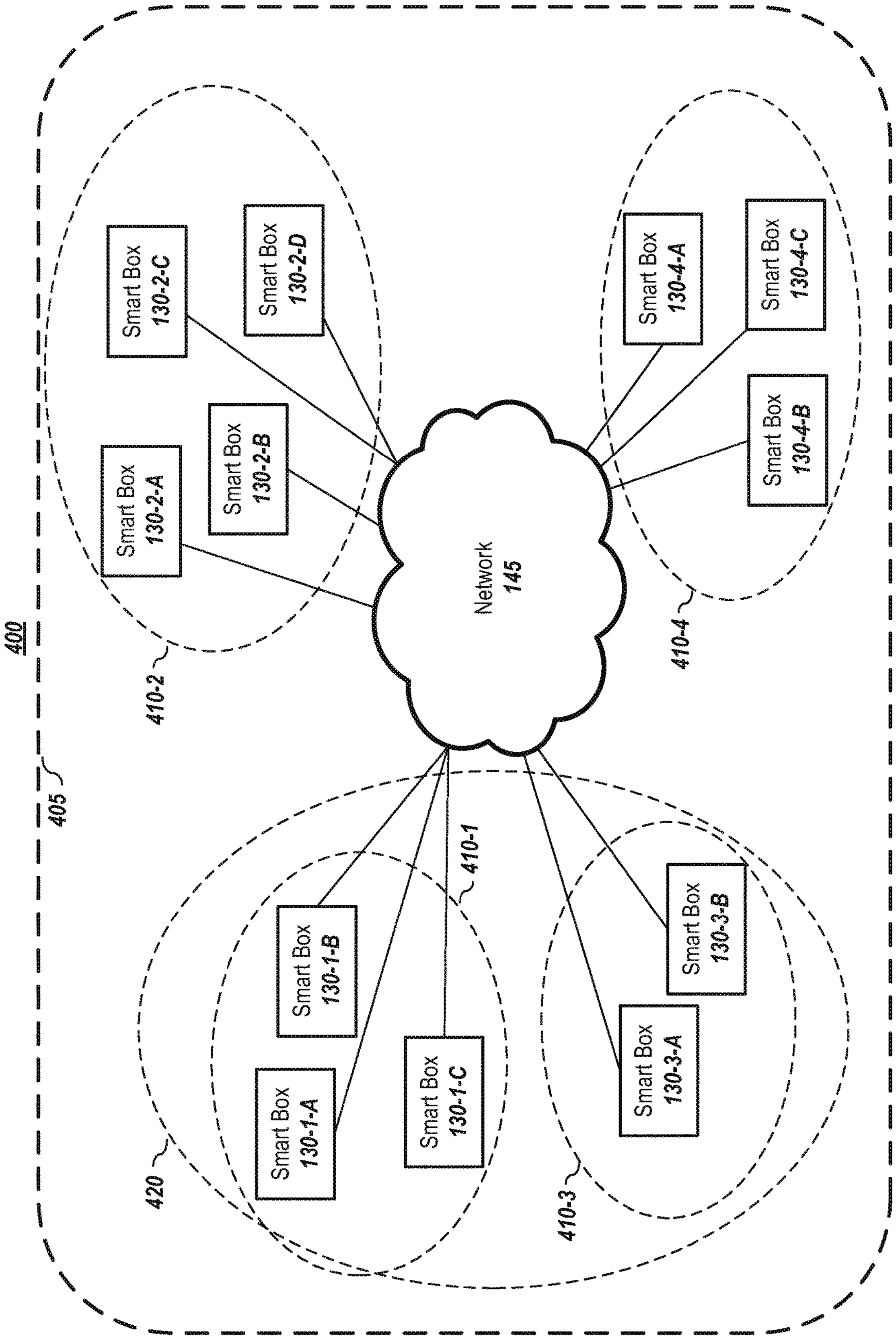
FIG. 4 graphically depicts an alternative deployed networked system, according to embodiments of the present disclosure.

FIG. 4 graphically depicts a deployed networked system, according to embodiments of the present disclosure. As shown in FIG. 4, a number of second computing systems 130 are deployed across a vast area 405 and are communicatively coupled via a network 145. In one or more embodiments, the systems 130 may be deployed into various regions denoted by the dashed lines 410. While not depicted in FIG. 4, each smart box 130 may be communicatively connected to one or more first computing systems as presented in FIG. 1. The different regions (e.g., regions 410 and 420) may represent regions in which the sensor data may collect information that has one or more common characteristics, such as subject matter, environmental conditions (e.g. lighting, cloudy, rainy, etc.), etc. As shown in FIG. 4, a region (e.g., region 420) may comprise subregions (e.g., regions 410-1 and 410-3). Given such a network system, the second neural network operating on one or more the smart boxes may be updated, according to embodiments of the present disclosure.

Figure 5:
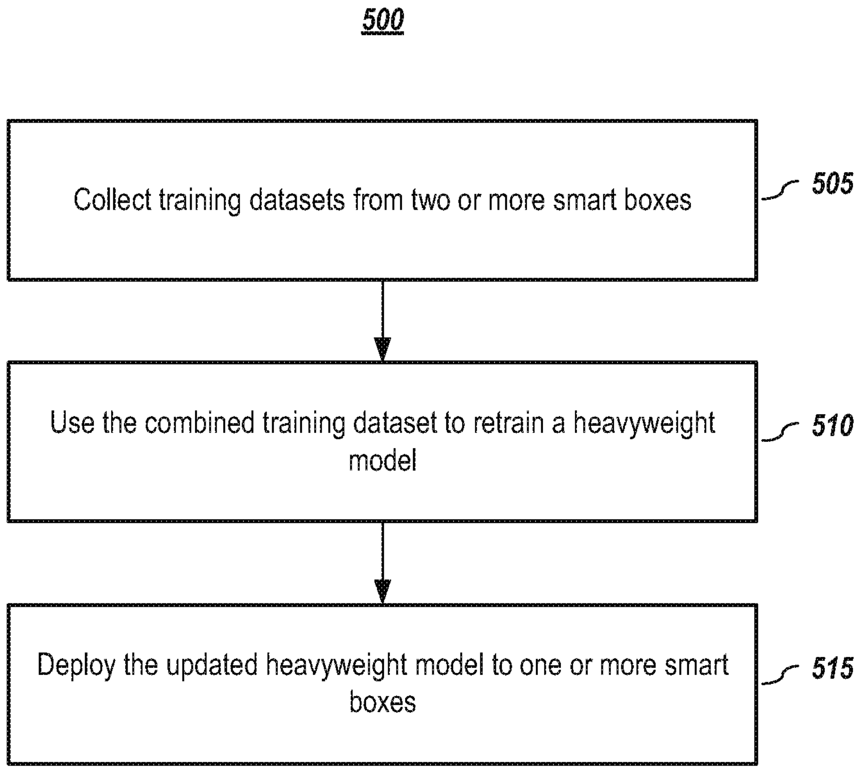
FIG. 5 depicts a methodology for retraining a deployed neural network model, according to embodiments of the present disclosure.

FIG. 5 depicts a methodology for retraining a deployed neural network model, according to embodiments of the present disclosure. In one or more embodiments, a central computing system/cloud computing system (not shown in FIG. 4) may collect (505) training datasets from two or more smart boxes 130. For example, the training dataset obtained for the smart boxes 130-2 in region 410-2 may be collected. These training datasets may be ones created in updating one or more first computing systems communicatively coupled to the respective smart boxes. In one or more embodiments, these collected trained sets, in whole or in part, are used to update/retrain (510) the heavyweight neural network model. Once updated, the updated heavyweight model may be deployed (515) to one or more smart boxes.

It shall be noted that embodiment may comprise using data with common characteristics (e.g., from a same region). Alternatively, more diverse datasets (e.g., data from different regions with different characteristics) may be collected and used to update the heavyweight neural network model to make it more robust. In one or more embodiments, the updated heavyweight neural network model may be deployed to select smart boxes or may be deployed to all smart boxes (e.g., all smart boxes 405). In one or more embodiments, different versions of the second neural network may develop and may be combined in like manner as described for the first neural network model in FIG. 3.

In one or more embodiments, the first neural network model may, additionally or alternatively, be updated centrally like the second neural network model.

One skilled in this area shall recognize several advantages of the systems and methods disclosed herein. First, the operations of the first computing device were minimally impacted as its neural network was retrained/updated—the most significant interruption is likely to be the time it takes to replace the original first neural network with the retrained/updated first neural network. Second, the process is online and automated. Third, the performance of the first neural network model increases. Fourth, the performance of the second neural network model may also be increased. Fifth, the data used for updating the first neural network and the second neural network may be global or regional data. One skilled in this area shall recognize other advantages as well.

C. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, stylus, touchscreen and/or video display. The computing system may also include one or more buses operable to transmit communications between the various hardware components.

Figure 6:
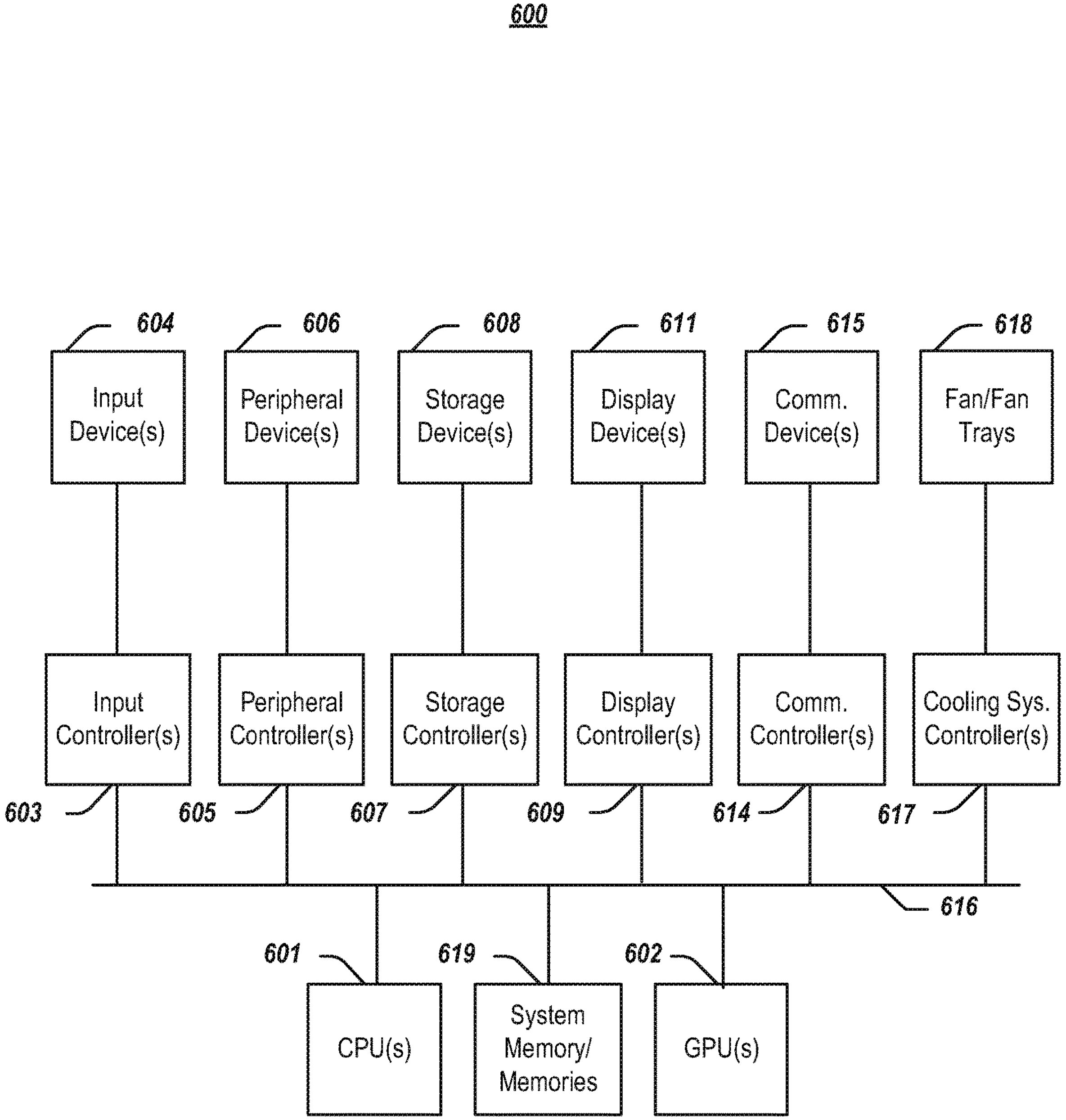
FIG. 6 graphically depicts a simplified block diagram of a computing device/information handling system, according to embodiments of the present disclosure.

FIG. 6 depicts a simplified block diagram of an information handling system (or computing system), according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 602 and/or a floating-point coprocessor for mathematical computations. In one or more embodiments, one or more GPUs 602 may be incorporated within the display controller 609, such as part of a graphics card or cards. Thy system 600 may also include a system memory 619, which may comprise RAM, ROM, or both.

A number of controllers and peripheral devices may also be provided, as shown in FIG. 6. An input controller 603 represents an interface to various input device(s) 604, such as a keyboard, mouse, touchscreen, and/or stylus. The system may also possess or receive data from one or more sensors (not shown). The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT) display, a thin film transistor (TFT) display, organic light-emitting diode, electroluminescent panel, plasma panel, or any other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 600 comprises one or more fans or fan trays 618 and a cooling subsystem controller or controllers 617 that monitors thermal temperature(s) of the system 600 (or components thereof) and operates the fans/fan trays 618 to help regulate the temperature.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact disc (CD) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as a CD and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:

receiving a set of results, which were obtained using a first neural network model that receives input data as an input and operates using a first computing system;

accessing accuracy of the first neural network using a second neural network model, which is more complex than the first neural network, operating on a second computing system, which is communicatively coupled to the first computing system, by inputting at least some of input data into the second neural network and comparing results of the second neural network model with corresponding results from the first neural network; and responsive to the accuracy of the first neural network being below a threshold measure:

obtaining input data collected for the first neural network;

using the collected input data as inputs into the second neural network to obtain corresponding results;

forming training data comprising the collected input data as input data and the corresponding results from the second neural network as ground truth results;

using the training data to update the first neural network; and responsive to the updated first neural network achieving accuracy above an update threshold value, deploying the updated first neural network on the first computing system.

2. The computer-implemented method of claim 1 wherein:

responsive to the updated first neural network not achieving accuracy above an update threshold value given existing training data:

obtaining additional input data collected for the first neural network;

obtaining additional corresponding results using the additional collected input data as inputs into the second neural network;

performing supplemental training on the first neural network or the updated first neural network using the additional collected input data and the additional corresponding results as supplemental training data; and responsive to the updated first neural network achieving accuracy above the update threshold value, deploying the updated first neural network on the first computing system.

3. The computer-implemented method of claim 2 wherein the supplemental training data comprises at least some training data that produce inaccurate results by the first neural network.

4. The computer-implemented method of claim 2 further comprising:

responsive to the updated first neural network not achieving accuracy above the update threshold value, repeating updating by returning to the step of obtaining additional input data collected for the first neural network.

5. The computer-implemented method of claim 1 wherein the second computing system is communicatively coupled to a plurality of first computing systems, in which each first computing system comprises a version of the first neural network and the method further comprises:

obtaining from each of at least some of the plurality of first computing systems its version of the first neural network;

forming a set of combined neural networks comprising a combination of two or more of the first neural networks;

using evaluation data to obtain accuracy measures for each combined neural network;

selecting a combined neural network with an acceptable accuracy measure; and deploying the combined neural network at least one of the first computing systems.

6. The computer-implemented method of claim 5 wherein the second computing system is communicatively coupled to a central computing system, which is communicatively coupled to a plurality of second computing systems which each comprises its version of training data, the method further comprising:

sending, from the second computing system to the central computing system, its training data; and receiving from the central computing system an updated second neural network;

wherein the updated second neural network was obtained by updating the second neural network using a training data superset obtained from at least some of the plurality of second computing systems.

7. The computer-implemented method of claim 6 wherein the training data selected from the plurality of second computing systems is done using one or more observed characteristics associated with the training data.

8. The computer-implemented method of claim 7 wherein one or more observed characteristics associated with the training data comprises training data obtained from first computing systems deployed within a region or training data obtained from first computing systems deployed in an environment with similar conditions.

9. A system comprising:

a second computing system comprising:

one or more communication connections, in which at least one of the communication connections connects with a first computing system;

one or more processors; and a non-transitory computer-readable medium or media comprising one or more sets of instructions which, when executed by at least one of the one or more processors, causes steps to be performed comprising:

receiving a set of results, which were obtained using a first neural network model that receives input data as an input and operates using a first computing system;

accessing accuracy of the first neural network using a second neural network model, which is more complex than the first neural network, operating on a second computing system, which is communicatively coupled to the first computing system, by inputting at least some of input data into the second neural network and comparing results of the second neural network model with corresponding results from the first neural network; and responsive to the accuracy of the first neural network being below a threshold measure:

obtaining input data collected for the first neural network; using the collected input data as inputs into the second neural network to obtain corresponding results;

forming training data comprising the collected input data as input data and the corresponding results from the second neural network as ground truth results;

using the training data to update the first neural network; and responsive to the updated first neural network achieving accuracy above an update threshold value, deploying the updated first neural network on the first computing system.

10. The system of claim 9 wherein the non-transitory computer-readable medium or media further comprise one or more sets of instructions which, when executed by at least one of the one or more processors, causes steps to be performed comprising:

responsive to the updated first neural network not achieving accuracy above an update threshold value given existing training data:

obtaining additional input data collected for the first neural network;

obtaining additional corresponding results using the additional collected input data as inputs into the second neural network;

performing supplemental training on the first neural network or the updated first neural network using the additional collected input data and the additional corresponding results as supplemental training data;

responsive to the updated first neural network achieving accuracy above an update threshold value, deploying the updated first neural network on the first computing system; and responsive to the updated first neural network not achieving accuracy above the update threshold value, repeating updating by returning to the step of obtaining additional input data collected for the first neural network.

11. The system of claim 9 wherein the first computing system comprises a camera system and the input data is image data and the first neural network and the second neural network are recognition models that are used to recognize one or more objects in an input image.

12. The system of claim 9 wherein the second computing system is communicatively coupled to a plurality of first computing systems, in which each first computing system comprises a version of the first neural network and wherein the non-transitory computer-readable medium or media further comprise one or more sets of instructions which, when executed by at least one of the one or more processors, causes steps to be performed comprising:

obtaining from each of at least some of the plurality of first computing systems its version of the first neural network;

forming a set of combined neural networks comprising a combination of two or more of the first neural networks;

using evaluation data to obtain accuracy measures for each combined neural network;

selecting a combined neural network with an acceptable accuracy measure; and deploying the combined neural network at least one of the first computing systems.

13. The system of claim 9 wherein the second computing system is communicatively coupled to a central computing system, which is communicatively coupled to a plurality of second computing systems which each comprises its version of training data, and wherein the non-transitory computer-readable medium or media further comprise one or more sets of instructions which, when executed by at least one of the one or more processors, causes steps to be performed comprising:

sending, from the second computing system to the central computing system, its training data; and receiving from the central computing system an updated second neural network;

wherein the updated second neural network was obtained by updating the second neural network using a training data superset obtained from at least some of the plurality of second computing systems.

14. The system of claim 13 wherein the training data selected from the plurality of second computing systems is done using one or more observed characteristics associated with the training data.

15. The system of claim 14 wherein one or more observed characteristics associated with the training data comprises training data obtained from first computing systems deployed within a region or training data obtained from first computing systems deployed in an environment with similar conditions.

16. A system comprising:
one or more sensor devices; and
a first computing system comprising:
one or more communication connections, in which at least one of the communication connections connects with a second computing system;
one or more processors; and
a non-transitory computer-readable medium or media comprising one or more sets of instructions which, when executed by at least one of the one or more processors, causes steps to be performed comprising:
capturing input data using at least one of the one or more sensor devices;
obtaining a set of results using a first neural network model that receives the input data as an input;
sending at least some of the set of results and the corresponding input data to a second computing system that accessing accuracy of the first neural network using a second neural network model, which is more complex than the first neural network by comparing results of the second neural network model with corresponding results from the first neural network;
receiving a request to provide collected input data to the second computing device;
providing the collected input data to the second computing device that uses the collected input data to form training data comprising the collected input data as input data and corresponding results from the second neural network as ground truth results; and
deploying an updated first neural network in place of the first neural network, in which the updated first neural network was updated using at least some of the training data.

17. The system of claim 16 wherein the request to provide collected input data to the second computing device comprises a request to collect input data with one or more characteristics that produce inaccurate results by the first neural network.

18. The system of claim 16 wherein the non-transitory computer-readable medium or media further comprise one or more sets of instructions which, when executed by at least one of the one or more processors, causes steps to be performed comprising:
receiving a request for additional input data collected for the first neural network;
collecting additional input data using one or more of the sensors; and
providing the additional collected input data to the second computing device that uses the collected input data to form additional training data comprising the additional collected input data as input data and corresponding results from the second neural network as ground truth results.

19. The system of claim 16 wherein the second computing system is communicatively coupled to a plurality of first computing systems, in which each first computing system comprises a version of the first neural network and wherein the non-transitory computer-readable medium or media further comprise one or more sets of instructions which, when executed by at least one of the one or more processors, causes steps to be performed comprising:
obtaining from the second computing system a combined neural network comprising a combination of two or more of first neural networks, wherein the combined neural network was selected from among a plurality of different combined neural networks based upon accuracy of results of the different combined neural networks; and
deploying the combined neural network using the first computing system.

20. The system of claim 16 wherein at least one of the one or more sensor devices comprises a camera system and the input data is image data and the first neural network and the second neural network are recognition models that are used to recognize one or more objects in an input image.

21. A non-transitory computer readable storage medium storing a computer program executable to cause one or more processors to cause steps to be performed comprising:
receiving a set of results, which were obtained using a first neural network model that receives input data as an input and operates using a first computing system;
accessing accuracy of the first neural network using a second neural network model, which is more complex than the first neural network, operating on a second computing system, which is communicatively coupled to the first computing system, by inputting at least some of input data into the second neural network and comparing results of the second neural network model with corresponding results from the first neural network; and
responsive to the accuracy of the first neural network being below a threshold measure:
obtaining input data collected for the first neural network;
using the collected input data as inputs into the second neural network to obtain corresponding results; forming training data comprising the collected input data as input data and the corresponding results from the second neural network as ground truth results;
using the training data to update the first neural network; and
responsive to the updated first neural network achieving accuracy above an update threshold value, deploying the updated first neural network on the first computing system.

22. A computer program product, comprising a program stored on a computer-readable storage medium, the program comprising program instructions executable to cause one or more processors to cause steps to be performed comprising:
receiving a set of results, which were obtained using a first neural network model that receives input data as an input and operates using a first computing system;
accessing accuracy of the first neural network using a second neural network model, which is more complex than the first neural network, operating on a second computing system, which is communicatively coupled to the first computing system, by inputting at least some of input data into the second neural network and comparing results of the second neural network model with corresponding results from the first neural network; and responsive to the accuracy of the first neural network being below a threshold measure:

obtaining input data collected for the first neural network;

using the collected input data as inputs into the second neural network to obtain corresponding results;

forming training data comprising the collected input data as input data and the corresponding results from the second neural network as ground truth results;

using the training data to update the first neural network; and responsive to the updated first neural network achieving accuracy above an update threshold value, deploying the updated first neural network on the first computing system.

* * * * *